UNITED STATES PATENT OFFICE.

HENRY SANTROCK, OF KENSINGTON, KANSAS.

TIRE COMPOUND.

1,108,399.   Specification of Letters Patent.   Patented Aug. 25, 1914.

No Drawing.   Application filed January 31, 1914. Serial No. 815,307.

*To all whom it may concern:*

Be it known that I, HENRY SANTROCK, a citizen of the United States, residing at Kensington, in the county of Smith and State of Kansas, have invented a new and useful Tire Compound, of which the following is a specification.

This invention has reference to improvements in tire compounds, and its object is to provide a compound sufficiently fluid to be introduced into the inner tube of a pneumatic tire through the valve stem to automatically and immediately close any punctures which may occur, and thereby prevent collapse of the tire because of the escape of the compressed air therefrom.

The tire compound of the present invention comprises printed paper, salt, wood alcohol, common resin, leaves of trees, and water.

The printed paper may be newspaper or other paper of like character upon which printing has been done, it being found that the amount of printers' ink present in newspapers is sufficient for the purposes of the present invention—that is, to give a desirable shade to the compound. The salt employed is ordinary salt, (chlorid of sodium), and serves as a preservative. The wood alcohol prevents freezing of the compound in cold weather.

To prepare the mixture the ingredients are mixed together in substantially the following proportions: 2 pounds of printed paper ground to a pulp, 1 pint of salt, 1 pint, more or less, of wood alcohol, 10 ounces of common resin, 5 ounces of dried leaves. The leaves and resin are ground together to a fine powder and then mixed with the printed paper which has previously been ground to a pulp, the leaves and resin giving the paper pulp more body than it would otherwise have, and to this body there is added enough soft water to make about five gallons of the composition, the salt and wood alcohol being also added and included in the five gallons. The ingredients may be all thoroughly mixed in a cylinder or other container suitable for the purpose. About one quart of the composition is introduced into the inner tube of a pneumatic tire through the valve stem after the valve has been removed, and by means of a suitable gun. The tire may then be revolved to spread the liquid to all parts of the interior thereof, and when in use the revolving of the wheels keeps the composition spread to all those parts of the tire liable to puncture. Should a puncture occur the composition will close the hole instantly, the air forcing the liquid and pulp into the hole, thereby plugging it and preventing the air from escaping.

The compound does not harden or solidify when it comes into contact with the air, it does not interfere with the vulcanizing of the rubber of the tire, nor is the rubber injured in any way, but leaves the tube when the composition is washed off the same as if the composition had not been used.

It is found in practice that the resin does not liquefy but the pulp of vegetable fibers is caused thereby to become inter-adherent so as to be more firm in a large puncture or hole, so that the solid matters readily plug up a puncture by flowing thereinto because of the general liquid nature of the composition, but quickly accumulate to an extent to thoroughly plug up the puncture and prevent air from escaping to any noticeable degree because of the cementitious nature of the resin.

It will be understood that the proportions given are those which in practice have proven efficient, but these proportions may be changed to some extent without sacrifice of the advantages of the compound and also some of the ingredients may be changed, as for instance, ground corn pulp may replace the dried leaves, wherefore the invention is not of necessity limited to any exact adherence to the particular proportions given.

What is claimed is:—

1. A composition for the purpose described, comprising paper ground to a pulp, salt, wood alcohol, resin, comminuted dry leaves of trees, and water.

2. A composition for the purpose described, comprising printed paper ground to a pulp, a preservative, an anti-freezing ingredient, powdered resin, comminuted dry leaves of trees, and water.

3. A compound for the purpose described, comprising paper pulp, salt, wood alcohol, resin, comminuted dry leaves of trees and water in substantially the following proportions: two pounds of printed paper ground to a pulp, one pint of salt, one pint of wood alcohol, ten ounces of resin ground to a powder, five ounces of leaves ground to a powder, and sufficient water to produce five gallons of the composition.

In testimony, that I claim the foregoing as my own, I have hereto affixed my signature in the presence of two witnesses.

HENRY SANTROCK.

Witnesses:
W. J. STEELE,
IVA SANTROCK.